US006408348B1

(12) United States Patent
Blount et al.

(10) Patent No.: US 6,408,348 B1
(45) Date of Patent: Jun. 18, 2002

(54) SYSTEM, METHOD, AND PROGRAM FOR MANAGING I/O REQUESTS TO A STORAGE DEVICE

(75) Inventors: Lawrence Carter Blount; Emeline Yvonne Germain; Vernon John Legvold; William Frank Micka; Warren Keith Stanley; Stephen Charles West, all of Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/372,985

(22) Filed: Aug. 20, 1999

(51) Int. Cl.$^7$ ................................................ G06F 13/00
(52) U.S. Cl. .............................. 710/38; 710/5; 711/111; 370/230
(58) Field of Search ...................... 710/5–7, 29, 36–40, 710/58–60; 711/111–114; 709/232–235; 370/230–237

(56) References Cited

U.S. PATENT DOCUMENTS

| | | | |
|---|---|---|---|
| 3,399,382 A | 8/1968 | Thron et al. .................. 710/60 |
| 3,680,055 A | 7/1972 | Wilson ......................... 710/57 |
| 4,378,588 A | 3/1983 | Kayzman et al. .............. 710/57 |
| 4,839,891 A | 6/1989 | Kobayashi et al. ......... 270/231 |
| 5,237,660 A | 8/1993 | Weber et al. ................. 710/57 |
| 5,249,271 A | 9/1993 | Hopkinson et al. ........... 710/57 |
| 5,414,816 A | 5/1995 | Oyadomari ................... 710/60 |
| 5,440,691 A | 8/1995 | Carrafielloi et al. ........ 709/234 |
| 5,450,546 A | 9/1995 | Krakirian ..................... 710/57 |
| 5,452,421 A * | 9/1995 | Beardsley et al. ............. 714/4 |
| 5,475,609 A * | 12/1995 | Apothaker ................... 364/492 |
| 5,493,566 A | 2/1996 | Ljungberg et al. .......... 370/231 |
| 5,546,549 A * | 8/1996 | Barrett et al. ................ 710/129 |
| 5,649,232 A | 7/1997 | Bourekas et al. .............. 710/60 |
| 5,692,155 A | 11/1997 | Iskiyan et al. ............... 711/162 |
| 5,701,429 A * | 12/1997 | Legvold et al. .............. 711/114 |
| 5,720,029 A | 2/1998 | Kern et al. .................... 714/20 |
| 5,721,898 A * | 2/1998 | Beardsley et al. ............. 707/3 |
| 5,771,367 A * | 6/1998 | Beardsley et al. .......... 711/162 |
| 5,875,479 A * | 2/1999 | Blount et al. ................ 711/162 |
| 5,991,775 A * | 11/1999 | Beardsley et al. .......... 707/205 |
| 6,145,028 A * | 11/2000 | Shank et al. .................. 710/31 |
| 6,314,491 B1 * | 11/2001 | Freerksen et al. .......... 711/124 |

OTHER PUBLICATIONS

IBM Technical Disclosure Bulletin, "Record Multiplexing In Data Storage System", vol. 29, No. 10, Mar. 1987, pp. 4603–4605.
IBM Technical Support Organization, "Planning for IBM Remote Copy", Dec. 1995, San Jose Center, SG24–2595–00, pp. 31–159.

* cited by examiner

Primary Examiner—Christopher B. Shin
(74) Attorney, Agent, or Firm—David W. Victor; Konrad Raynes Victor & Mann (57) ABSTRACT

Disclosed is a system, method, and program for limiting input/output (I/O) requests from an application program to a storage device to facilitate the processing of data in memory. A determination is made as to whether an amount of a set of data in memory exceeds at least one threshold. At least one of multiple paths to the storage device is indicated as blocked to I/O requests from the application program. Each indicated blocked path is available for processing the set of data in memory. An I/O request from the application program is received and a determination is made as to whether the received I/O request intends to access the storage device using one indicated blocked path. The I/O request is denied access to the storage device via the blocked path.

27 Claims, 4 Drawing Sheets

SYSTEM, METHOD, AND PROGRAM FOR MANAGING I/O REQUESTS TO A STORAGE DEVICE

BACKGROUND OF THE INVENTION

1. Field of the Invention

The present invention relates to a system, method, and program for blocking input/output (I/O) access to paths to a storage device to facilitate the processing of data in memory.

2. Description of the Related Art

Host computer systems may access a mass storage unit, such as a Direct Access Storage Device (DASD), which is comprised of numerous interconnected hard disk drives (HDDs) that form a single mass storage space. In such systems, a control unit manages input/output (I/O) operations between the host systems and the DASD. Examples of control units include the International Business Machines ("IBM") 3990 Storage Controller, described in IBM publication, "IBM 3990 Storage Control Reference (Models 1, 2, and 3), IBM document no. GA32-0099-06 (Copyright IBM Corp. 1988, 1994), which publication is incorporated herein by reference in its entirety.

Business organizations often insist on continuous availability to critical data twenty four hours a day, every day of the year. For many businesses and organizations, such as banks and other financial institutions, inability to access data for any period of time could lead to loss of financial transactions, financial losses, loss of credibility and reliability with customers, and maybe even a total failure of the business. Therefore, the ability to provide continuous availability to data for the mission critical applications is more often than not a necessity for business survival. Some data storage systems provide a shadow system which provides periodic back-up of data written to the primary storage system. This insures near real-time recovery of data at the shadow site. To provide continuous availability of data, International Business Machines Corporation ("IBM") offers Extended Remote Copy (XRC) and Peer-to-Peer Remote Copy (PPRC). The IBM XRC systems provides a system data mover (SDM) that copies data from a primary site to a secondary site. Each site includes a control unit and DASD. Data updates to tracks at the primary control unit are transferred from the primary control unit cache to the secondary control unit for back-up storage at the secondary DASD. This secondary site functions as the recovery site in case data is lost or damaged at the primary site. Details of the IBM XRC system are described in the IBM publication "Planning for IBM Remote Copy," IBM publication no. SG24-2595-00 (Copyright IBM Corp. 1995), which publication is incorporated herein by reference in its entirety.

In the IBM XRC system, a system data mover (SDM) component transfers updates to volumes in the primary DASD to the secondary storage. Data updates to transfer to secondary storage are maintained in an area of the primary control unit cache referred to as the "sidefile." The SDM transfers data updates from the sidefile portion of primary cache to the secondary control unit for application to the secondary DASD. When the amount of data in the sidefile exceeds certain thresholds, the primary control unit will inhibit application I/O processing to allow the SDM to drain the sidefile. See "Planning for IBM Remote Copy," pg. 129, which publication was incorporated herein by reference above.

In current implementations, if the sidefile exceeds a predetermined threshold, then a busy message is returned to any host application directing an I/O operation toward the control unit having the overfilled sidefile. This busy message prevents the host application receiving the busy message from presenting any further I/Os to the control unit until the sidefile is sufficiently drained.

This method of draining the sidefile is sometimes problematic for users, such as large financial institutions and other organizations, that require continuous access and availability to business data. For instance, banking institutions cannot have any period where I/Os are not processed; otherwise, processing of financial transactions may come to a halt if the systems performing the financial transactions cannot access data.

Thus, there is a need in the art for an improved method, system, and program for draining the sidefile to improve data recovery capabilities and, at the same time, permit continual I/O access to the storage device to provided continual access to data.

SUMMARY OF THE PREFERRED EMBODIMENTS

To overcome the limitations in the prior art described above, preferred embodiments disclose a system, method, and program for limiting input/output (I/O) requests from an application program to a storage device to facilitate the processing of data in memory. A determination is made as to whether an amount of a set of data in memory exceeds at least one threshold. At least one of multiple paths to the storage device is indicated as blocked to I/O requests from the application program. Each indicated blocked path is available for processing the set of data in memory. An I/O request from the application program is received and a determination is made as to whether the received I/O request intends to access the storage device using one indicated blocked path. The I/O request is denied access to the storage device via the blocked path.

In further embodiments, determining whether the set of data in memory exceeds one threshold involves determining whether the set of data exceeds one of a multiple number of thresholds. In such case, exceeding one threshold increases the number of paths to the storage device that are blocked. Still farther, a determination may be made as to the threshold value that the set of data in memory exceeds. Each incrementally higher threshold value may correspond to blocking one more path. In such case, indicating the paths that are blocked comprises indicating a number of paths blocked that corresponds to the paths blocked for the determined threshold value.

Further embodiments provide stopgap methods to allow an I/O request access to an otherwise blocked storage path if certain conditions are satisfied. For instance, if the blocked I/O path has denied I/O requests for a predetermined number of instances or a time period, then the blocked path will nonetheless process the I/O request.

Preferred embodiments provide blocking levels to limit I/O requests' use of storage paths. Blocked storage paths are available to process the set of data in memory. For instance, the set of data in memory may comprise a sidefile of data updates to a primary DASD to transfer to a secondary DASD for data back-up therein. In such case, blocked storage paths are reserved to insure that data updates in the sidefile are applied to the secondary storage in a manner that prevents the sidefile holding the updates from consuming sufficient cache to adversely affect system performance.

BRIEF DESCRIPTION OF THE DRAWINGS

Referring now to the drawings in which like reference numbers represent corresponding parts throughout.

DETAILED DESCRIPTION OF THE PREFERRED EMBODIES

In the following description, reference is made to the accompanying drawings which form a part hereof and which illustrate several embodiments of the present invention. It is understood that other embodiments may be utilized and structural and operational changes may be made without departing from the scope of the present invention.

Computing Environment

Figure 1:
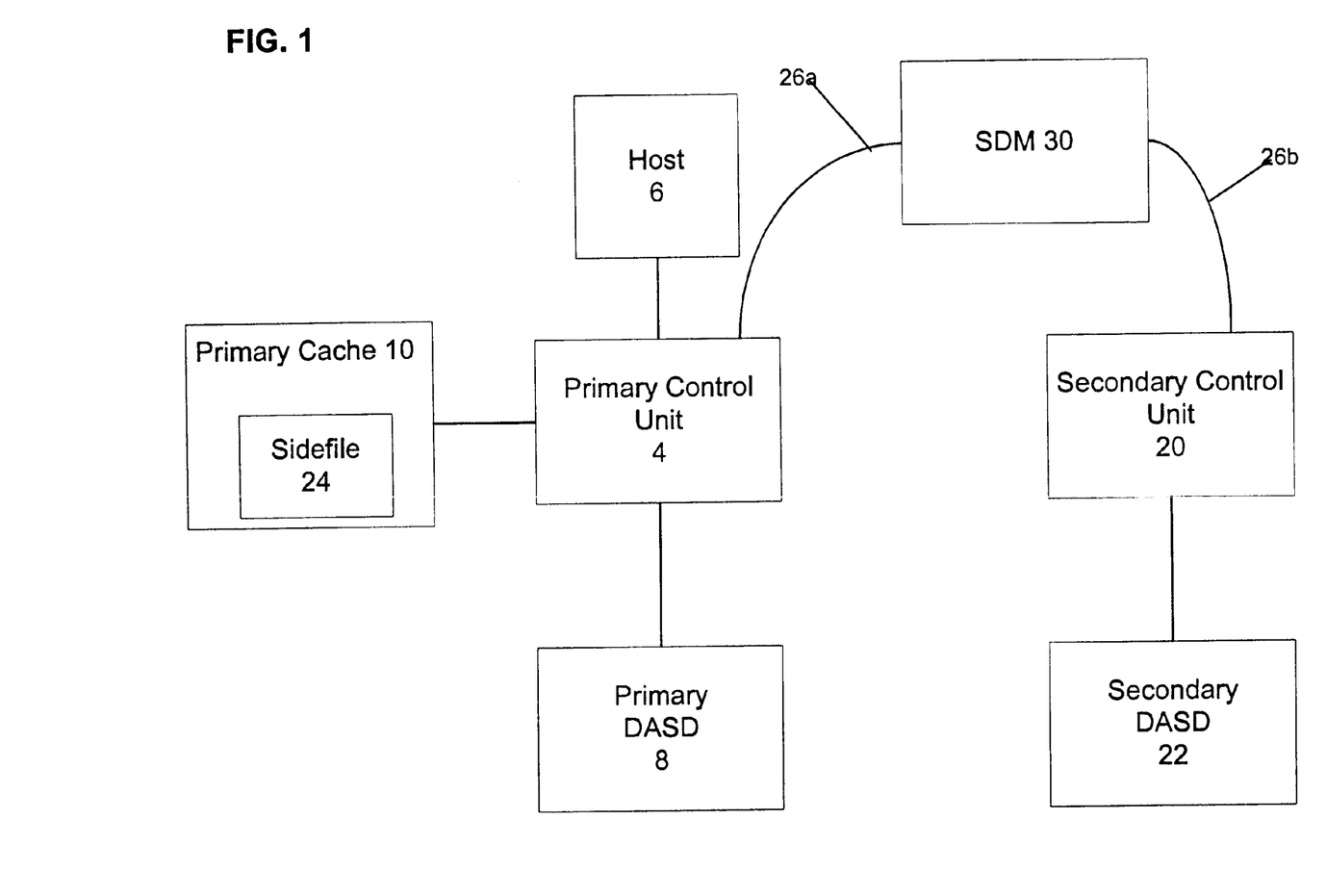
FIG. 1 is a block diagram illustrating a computing environment in which preferred embodiments are implemented.

FIG. 1 illustrates an IBM XRC computing environment in which preferred embodiments are implemented. A primary control unit 4 provides one or more host 6 computers access to a primary DASD 8. The primary control unit 4 has a primary cache 10 in which updates to tracks in the DASD 8 are maintained until destaged to DASD 8. Back-up copies of all or a subset of the volumes of the DASD 8 may be maintained at a secondary DASD 22. A "volume pair" comprises a volume in the primary DASD 8 and the shadow of that volume in the secondary DASD 22 that maintains a back-up copy of the data at the primary volume in the volume pair. Thus, for each primary volume, there is a corresponding secondary volume with identical contents; this is a volume pair. Updates to the primary DASD 8 are transferred to the secondary control unit 20 for storage in the secondary DASD 8 to assure that the secondary DASD 22 maintains a consistent and concurrent image of the primary DASD 8. Data updates to the primary DASD 8 that are waiting to be transferred to the secondary control unit 20 are maintained in a portion of the primary cache 10 referred to as the sidefile 24. The primary control unit 4 may further include a non-volatile storage unit (not shown), such as a battery-backed up volatile memory, to maintain a non-volatile copy of data updates. The control units 4 and 20 may be comprised of the IBM 3990, Model 6 Storage Controller, or any other control unit known in the art.

Preferred embodiments include a system data mover (SDM) program 30, such as the SDM program included in the IBM XRC system, that is in communication with the primary 4 and secondary 20 control units, and manages the process of transferring updates to the primary DASD 8 volumes maintained in the sidefile 24 to the secondary DASD 22. Thus, data is transferred between the primary 4 and secondary 20 control units via the SDM 30. In preferred embodiments, the SDM 30 and the control units 4 and 20 via communication paths 26a, b, which are preferably direct high speed transmission lines, such as an Enterprise System Connection** link. However, the communication paths 26a, b may be comprised of any other communication means known in the art, including network transmission lines, etc. SDM 30 further provides data consistency to insure that updates to secondary volumes are made in the same order in which they were made to the primary volumes, maintaining update sequence consistency. The SDM software may be maintained at the site of the primary control unit 4, the secondary control unit 20 or an independent site. Further details of the preferred computing environment are described in the IBM Publication "Planning for IBM Remote Copy," which publication was incorporated by reference above.

Figure 2:
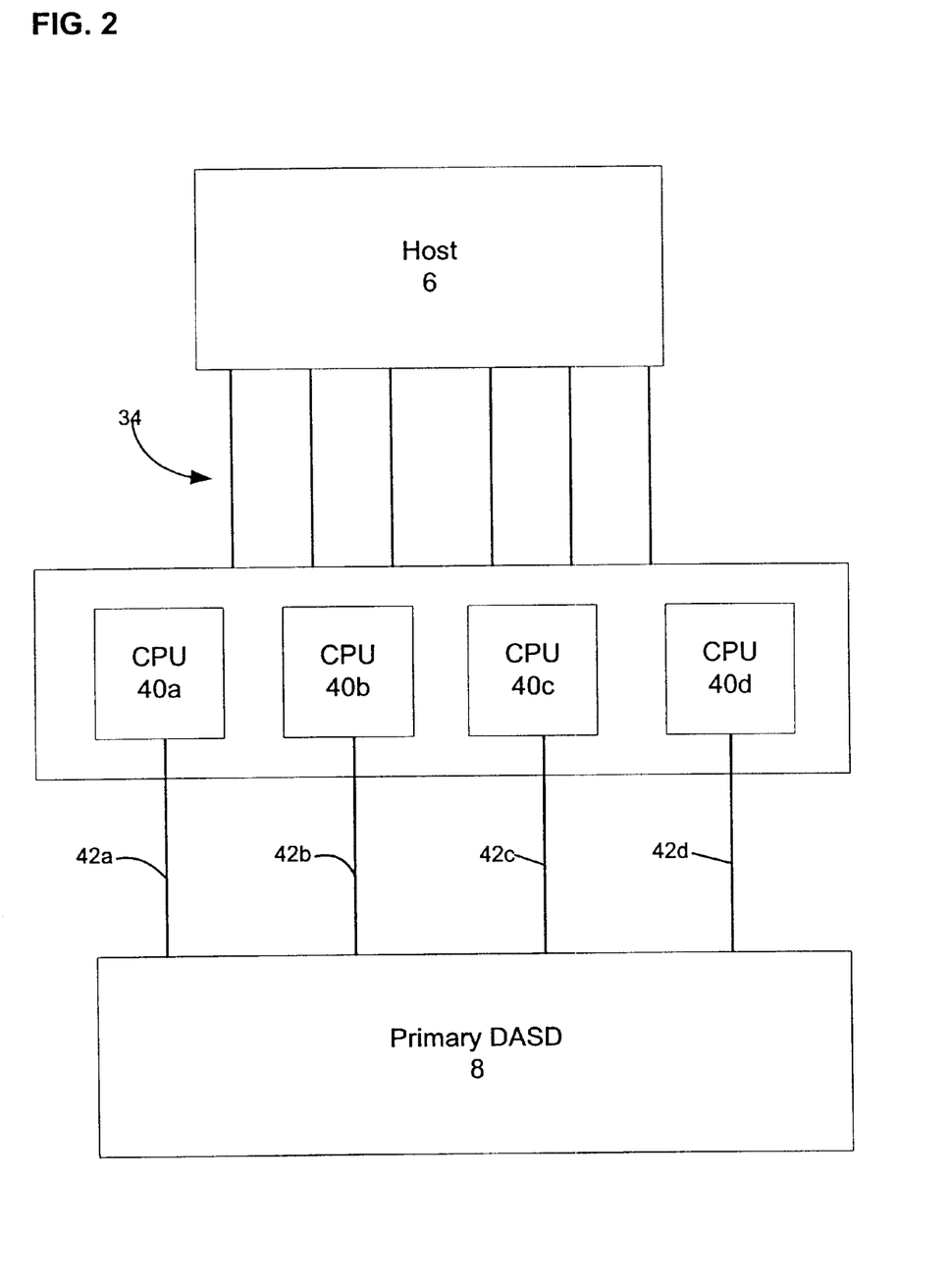
FIG. 2 illustrates further detail of the computing environment in which preferred embodiments are implemented.

FIG. 2 provides further details of the architecture within the host 6 and primary control unit 4. The host 6 communicates chains of commands to the primary control unit 4 through channel paths 34. The host 6 may view the control unit 4 as a multitude of separate control unit images or logical subsystems (LSSs), wherein each control unit image provides access to one or more volumes. The primary control unit 4 includes multiple processors CPUs 40a, b, c, d. Each CPU 40a, b, c, d provides a path 42a, b, c, d between the primary control unit 4 and the primary DASD 8. To execute an I/O command, the host 6 must obtain an available channel path 34 and storage path 42a, b, c, d. The host 6 transmits an I/O command via one channel path 34 to one CPU 40a, b, c, d, which then executes the command against the primary DASD 8 via the storage path 42a, b, c, d. When executing I/O commands against the DASD 8, the CPUs 40a, b, c, d may start an access command against the primary DASD 8, such as a seek or search command, and then disconnect from the channel 34 to receive another I/O command from another channel. The CPU 40a, b, c, d would reconnect to the host 6 initiating the command after obtaining requested data or completing the update. With dynamic path reconnection, the control unit 4 may reconnect to the host 6 via any available channel path there between. Further details of the architecture of the channels 34 and storage paths 42a, b, c, d, and interaction between the control unit, host, and DASD are described in the commonly assigned and co-pending patent applications: "Method And System For Dynamically Assigning Addresses To An Input/Output Device," by Brent C. Beardsley, Allan S. Merritt, Michael A. Paulsen, and Harry M. Yudenfriend, filed on Oct. 7, 1998, and having U.S. patent Ser. No. 09/167,782; and "System For Accessing An Input/Output Device Using Multiple Addresses," by Brent C. Beardsley, James L. Iskiyan, James McIlvain, Phillip R. Mills, Michael A. Paulsen, William G. Thompson, Harry M. Yudenfriend, filed on Oct. 7, 1998, and having U.S. patent Ser. No. 09/168,017, which patent applications are incorporated herein by reference in their entirety; and the "IBM 3990 Storage Control Reference," which publication was incorporated herein by reference above.

The storage paths 42a, b, c, d refer to the corresponding CPUs 40a, b, c, d that control access to a device or volume in the DASD 8. To access a track in the DASD 8, the storage path 42a, b, c, d establishes orientation by determining the location of a read/write head over a disk in the DASD 8, and changing states as data is read and written to the DASD 8.

The primary control unit 4 may transmit a busy status to a channel 34 to block execution of an I/O operation initiated from the host 6. The control unit 4 returns a control unit end status to the host 6 after the control unit busy condition no longer exists, i.e., a no-longer-busy status, to allow the host 6 to proceed with the I/O operation interrupted by the previous busy status.

Use of Blocking Levels to Drain Sidefile

If the rate of I/O requests to the primary DASD 8 significantly exceeds the transfer rate of updates from the sidefile 24 to the SDM 30, then the sidefile 24 may reach a predetermined maximum size. For instance, the maximum size of the sidefile may be determined as a percentage of cache, e.g., 60%. Alternatively, the maximum size of the sidefile 24 may be expressed as a maximum number of records. In current IBM XRC implementations, the maximum size of a sidefile 24 is set to 63K. This number is determined based on the number of bits available to express the number of records in the sidefile 24. For instance, if a 16 bit code is used to express the number of records in the sidefile 24, then there may be no more than 65,536 ($2^{16}$) records in the sidefile 24 as this is the maximum number of records that can be expressed with a 16 bit code. For this reason, the threshold number of records in the sidefile is set to 63K.

Preferred embodiments provide different blocking levels having different thresholds for determining the number of storage paths 42a, b, c, d to block from host 6 I/O activity. The storage paths 42a, b, c, d are the processors in the controller CPU 40a, b, c, d. When a host channel attempts to connect to the control unit, one of the storage paths 42a, b, c, d is reserved to handle the sidefile I/O request. By not allowing the non-SDM 30 hosts to connect to one or more of the storage paths, the storage path remains free to accept a request from the SDM 30. In this way, the blocked storage paths are reserved for SDM 30 transfers from the sidefile 24. Moreover, blocking limits the update rates to the host 6 to further increase the opportunity the SDM 30 has to drain the sidefile.

Figure 3:
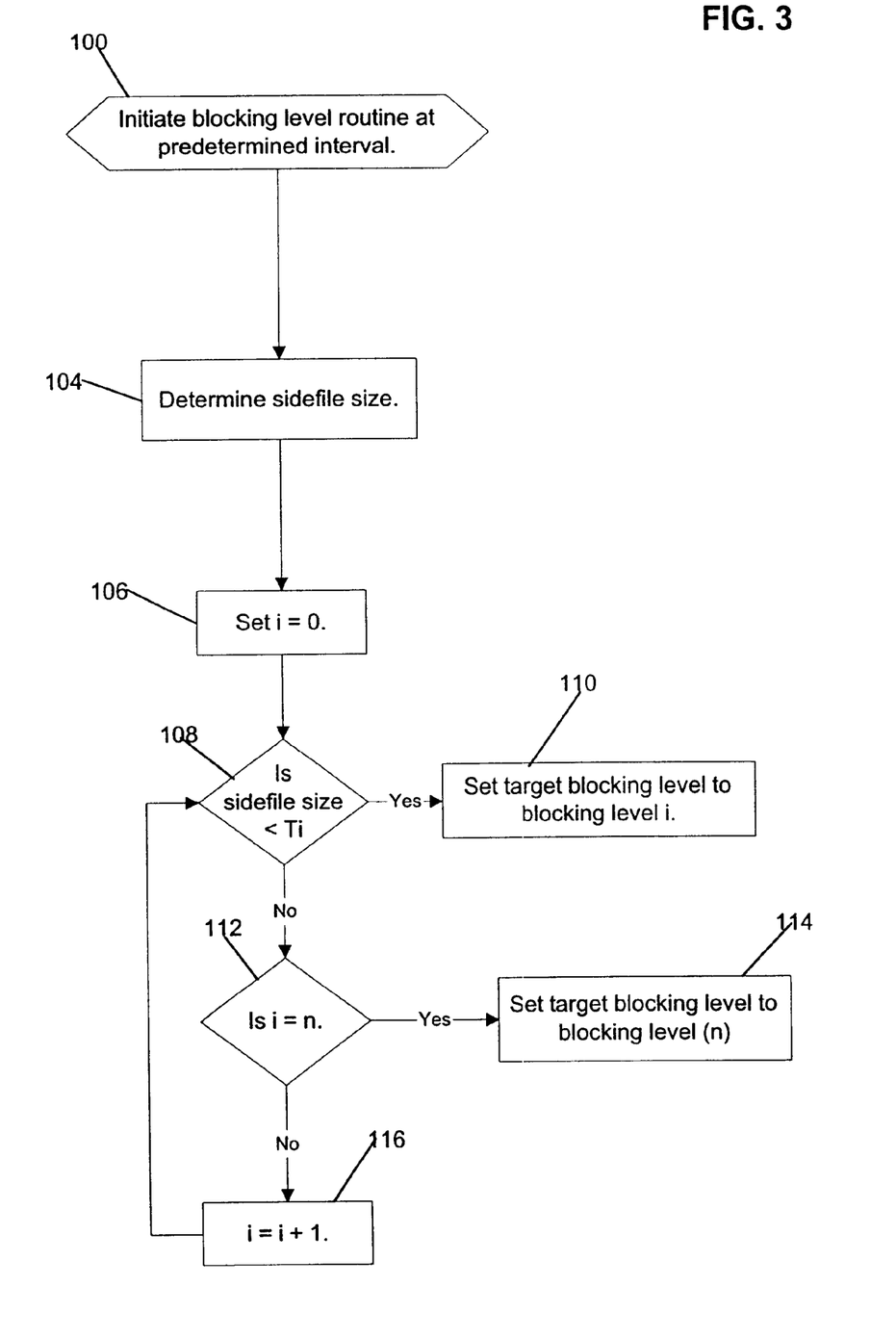
FIG. 3 illustrates logic to determine the appropriate level of blocking of storage paths in accordance with preferred embodiments of the present invention.

FIG. 3 illustrates logic implemented in the primary control unit 4 to determine the blocking level to use to limit the number of storage paths 42a, b, c, d available for host 6 I/O activity. In the logic of FIG. 3, $T_i$ indicates a threshold to determine the blocking level. If the sidefile size is greater than $T_i$ but less than $T_{(i+1)}$, then the blocking level is i. In preferred embodiments, the threshold $T_i$ is expressed as a threshold number of record sets. However, in alternative embodiments, the threshold $T_i$ may be expressed in different units, such as a percentage of available primary cache 10.

If a host 6 initiates an I/O operation to use an available storage path 42a, b, c, d, other than the blocked storage path, then the control unit 4 will accept the I/O command. However, if the requested storage path is unavailable or blocked, then the control unit 4 will send a busy signal to indicate that no path is available to process the I/O operation. If blocking the storage paths 42a, b, c, d does not result in a reduction in the sidefile 24 size, and the sidefile 24 still continues to increase to some absolute threshold, then the control unit 4 may initiate a long busy signal. A long busy signal may be in the form of a unit check status with sense data, which indicates to the host 4 that there are no available storage paths 42a, b, c, d, and to cease I/O activity.

In preferred embodiments, there is also a lower threshold to halt the long busy condition once the long busy signal is initiated. Preferably, this lower threshold for the long busy signal is less than the absolute threshold that triggers the long busy signal. The reason for requiring the sidefile size to fall a certain amount below the absolute threshold that triggers the long busy signal is that continual transmission of the long busy signal and an interrupt to withdraw the long busy signals could consume substantial I/O resources, especially if such messages increase as the number of records in the sidefile 24 fluctuates above and below the upper threshold n. For this reason, the lower threshold for the absolute maximum sidefile 24 size is set lower than the absolute maximum level to assure that the long busy is not frequently activated and deactivated. This difference between the lower threshold and absolute maximum threshold provides some assurance that once a state change interrupt is sent to end the long busy signal, the long busy signal will not be activated for some time, at least until the sidefile file again reaches the absolute maximum size.

At predetermined time intervals, the primary control unit 4 initiates a routine (at block 100) to determine a blocking level to apply. The primary control unit 4 determines (at block 104) the size of the sidefile 24. As discussed the size of the sidefile 24 can be expressed in terms of a number of records or a percentage of cache 10. A variable i is set (at block 106) and the control unit 4 determines (at block 108) whether the sidefile 24 size is less than $T_i$. If so, the target blocking level is set (at block 110) to blocking level i. Otherwise, a determination is made (at block 112) whether i=n, where n is the last possible blocking level, corresponding to the number of storage paths that may be blocked to reserve for I/Os from the sidefile 24. If i=n, then the target blocking level is set (at block 114) to blocking level n. Otherwise, if i is not equal to n, then i is incremented (116), and then control proceeds back to block 108 to consider whether the sidefile 24 size is less than the next threshold $T_{i+1}$.

After determining a target blocking level at block 110 or 114, the primary control unit 4 would then indicate that i storage paths, corresponding to blocking level i, are unavailable for I/O requests from the host 6. In this way, the storage paths 42a, b, c, or d unavailable to the host 6 are reserved for the SDM 30 to use to transfer data to the secondary control unit 20 for back-up purposes.

Figure 4:
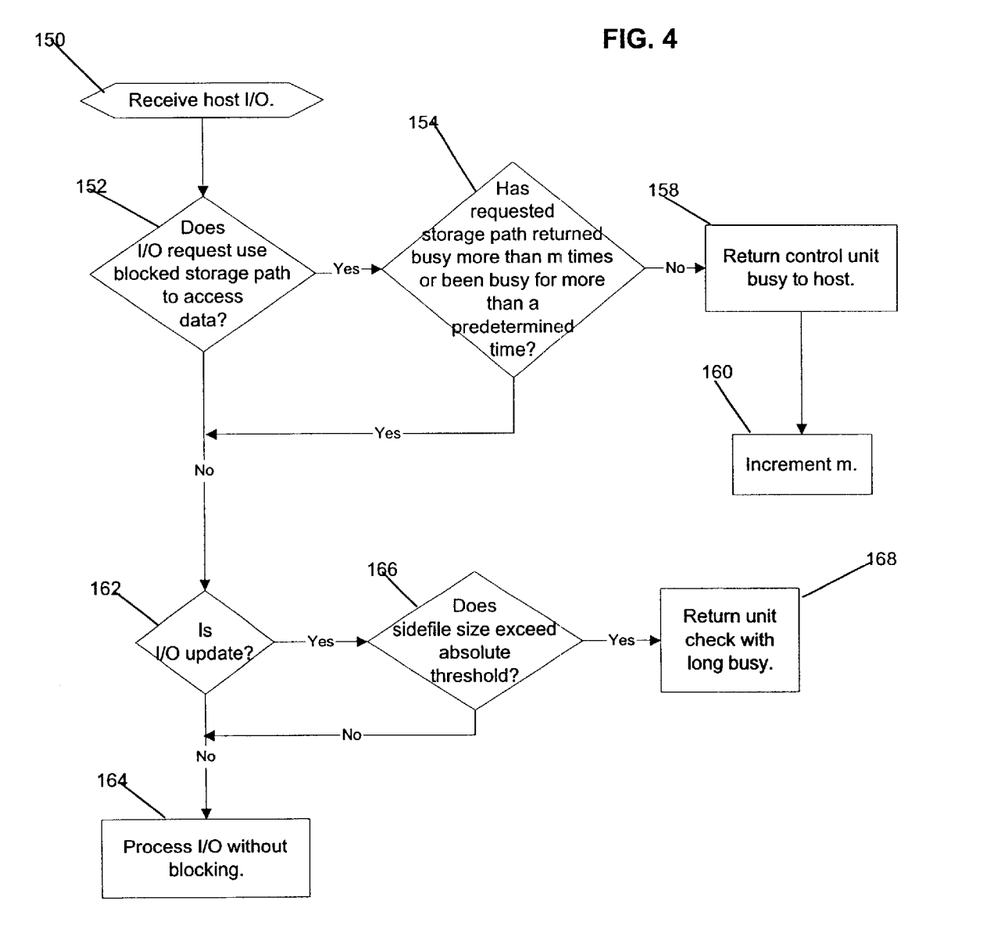
FIG. 4 illustrates logic to process host I/O requests in accordance with preferred embodiments of the present invention.

FIG. 4 illustrates logic implemented by the primary control unit 4 to process an I/O request from the host 6. Control begins at block 150 where the primary control unit 4 receives an I/O request from the host 6. The primary control unit 4 determines (at block 152) whether the I/O request needs to link the channel path 34 on which the I/O request arrived with a blocked storage path. If the I/O request requires use of a blocked storage path 42a, b, c, d, then the primary control unit 4 determines (at block 154) whether the storage path 42a, b, c, d has returned busy more than m times, where m is a threshold, or has been busy for some predetermined time period. Block 154 is a stopgap step to have an otherwise blocked storage path process an I/O request if the storage path has been unavailable for some predetermined value. As discussed, with critical data, the host 6 needs continual access to the data. Thus, block 154 provides some assurance that the host 6 will be provided access to data in certain instances. The predetermined stopgap values should be set to allow access with sufficient frequency in the event storage paths are blocked to avoid the situation where the host 6 would time-out.

If the stopgap condition has not been met, then the primary control unit 4 returns (at block 158) control unit busy to the host 6 to suppress the I/O request. After the busy condition ends, i.e., the blocking level is removed, then the primary control unit 4 would return a control unit end status message indicating the end of the busy condition to allow the host 6 to proceed with the I/O operation interrupted by the previous busy status. A channel 34 may continue to transmit I/O operations to the storage path 42a, b, c, d after receiving a busy message, and may receive additional busy messages from the control unit 4. Thus, a pending control unit end does not necessarily preclude initiation of new operations. Only one control unit end indication is returned on a logical path, regardless of the number of times the channel accepted control-unit-busy status on that logical path during the busy period. After returning control unit busy, the threshold m is incremented (at block 160), indicating that another consecutive control unit busy has been returned.

If the stopgap condition is met (from the YES branch at block 154) or the I/O request does not use the blocked storage path (from the NO branch of block 152), then the primary control unit 4 determines (at block 162) whether the I/O request is to update a track in the DASD 8 that is in a volume pair subject to remote copy operations. If the I/O update is to a volume involved an XRC session, i.e., subject to remote copy operations, then the primary control unit 4 determines (at block 166) whether the sidefile 24 size exceeds some absolute limit. This absolute limit may be set slightly below the absolute threshold size or number of records the sidefile 24 can maintain. If this absolute limit is exceeded or met, then the primary control unit 4 returns (at block 168) a unit check status including sense data indicating a long busy signal to the requesting host 6. This command causes the host 6 to cease any I/O requests toward the primary control unit 4 until the primary control unit 4 returns a State Change Interrupt indicating the long busy condition no longer exists. The primary control unit 4 would issue a State Change Interrupt command after determining that the sidefile 24 size is some level below the absolute limit on the sidefile 24 size.

If the I/O request is not to update a track in the DASD 8 subject to back-up copy operations, e.g., a volume pair, or the sidefile 24 size does not exceed the absolute limit, then the primary control unit 4 processes (at block 164) the I/O request in the normal manner.

The logic of FIG. 4 may allow a storage path that was designated as blocked according to a blocking level to be used to process I/O requests. Such an event would occur during the interval between execution of the blocking level routine in FIG. 3 to determine the appropriate blocking level. Thus, after the stopgap measures of FIG. 4 allow a storage path designated as blocked to process an I/O request, the execution of the blocking level routine of FIG. 3 may adjust the blocking level and again block the storage path. Thus, the stopgap measures provide a period of availability of an otherwise blocked storage path between execution of the blocking level routine. Further, there is a final stopgap measure which blocks all I/Os from the host 6 with a long busy in the event the sidefile 24 size has reached an absolute limit, at block 156.

In preferred embodiments, the storage paths selected for blocking alternate each time the blocking level is determined using the logic of FIG. 3. In this way, storage paths are blocked equally over time. If one or more storage paths are disabled, then the blocking levels would apply to the functioning storage paths. In such case, the blocking level denotes a percentage of the storage paths to block, regardless of the number of functioning storage paths.

With the logic of FIG. 4, preferred embodiments will block I/O requests on one or more storage paths to reserve the storage paths for SDM 30 data transfers from the sidefile 24 to the secondary control unit 20 for data back-up. Preferred embodiments, provide various mechanisms to process I/O requests, albeit at a slower rate. However, the preferred embodiments are an improvement over the art as I/O requests to critical data are continually allowed. Preferred embodiments include stopgap measures to provide further openings to process I/O requests from the host 6 to avoid the situation where critical data is unavailable to the host 6.

Conclusion

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize many modifications may be made to this configuration without departing from the scope of the present invention.

Preferred embodiments were described with respect to the IBM XRC computing environment. However, the preferred logic for draining a sidefile could be applied to drain out a portion of cache for purposes other than data transfer in a remote copy environment. Thus, in alternative embodiments, the portion of cache being drained by blocking I/O requests may include data other than data to be moved between different sites or storage areas for back-up purposes. Further, preferred embodiments may apply to I/O environments other than the IBM XRC environment, such as a peer-to-peer back-up system, e.g., IBM PPRC.

Preferred embodiments were described as implemented in a mainframe operating system, such as the IBM S/390 system, and the IBM 3990 Storage Controller where specific commands, such as control unit end, device end, etc., are involved when the storage controller attempts to reconnect to the I/O operation. However, those skilled in the art will appreciate that the data structures and logic of FIGS. 3 and 4 to reduce I/O traffic could apply to any data transfer interface known in the art, including SCSI, ST-506/ST-412, IDE/ATA, Enhanced Small Device Interface (ESDI), floppy disk, parallel port, ATA, EIDE, ATA-2, Fast ATA, Ultra ATA, etc.

The host 6 may be any central electronic complex (CEC) system known in the art including multiple CPUs executing simultaneous operations. The CEC may include one or more operating systems. Thus, one CEC host can appear to operate as several host systems. Each operating system in a single CEC would have its own addressing, thereby making the CEC appear as multiple hosts in a single machine. In preferred embodiments, channels from the CEC are ESCON channels connecting to the control unit 4.

Preferred embodiments were described with respect to a host system that communicates with a channel subsystem, which in turn communicates via channel paths to control units, which access the I/O devices. In alternative embodiments, the data paths may extend from the channel subsystem directly to the I/O device or, alternatively, from the host system directly to the I/O device without the intervention of the channel subsystem and subchannel constructs.

The logic of FIGS. 3 and 4, described with respect to the flowcharts, may be implemented in programmable gate arrays, such as a filled programmable gate array (FPGA) or complex programmable logic device (CPLD). In this way, the logic may be updated or reconfigured from files maintained in a non-volatile memory device that is part of the control unit 4. These files including the code needed to configure the logic may be retrieved from over a network or from a provided memory device, such as a CD-ROM. Such readily programmable logic is especially useful for the initial introduction of a product where updates and fixes may need to be provided. Alternative embodiments may be implemented in non-programmable logic, such as application specific integrated circuits (ASICs), which are typically less expensive than the programmable logic devices.

Preferred embodiments were described with respect to a Count-Key-Data environment in which data is stored as records in tracks. However, data may be stored in any format known in the art, including fixed blocks, etc.

In summary, preferred embodiments disclose a system, method, and program for limiting input/output (I/O) requests from an application program to a storage device to facilitate the processing of data in memory. A determination is made as to whether an amount of a set of data in memory exceeds at least one threshold. At least one of multiple paths to the storage device is indicated as blocked to I/O requests from the application program. Each indicated blocked path is available for processing the set of data in memory. An I/O request from the application program is received and a determination is made as to whether the received I/O request intends to access the storage device using one indicated blocked path. The I/O request is denied access to the storage device via the blocked path.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for limiting input/output (I/O) requests from an application program to a storage device to facilitate the processing of data in memory, comprising:

determining whether an amount of a set of data in memory exceeds at least one threshold;

indicating at least one of multiple paths to the storage device as blocked to I/O requests from the application program, wherein each indicated blocked path is available for processing the set of data in memory;

receiving an I/O request from the application program;

determining whether the received I/O request intends to access the storage device using one indicated blocked path; and denying the I/O request access to the storage device via the blocked path.

2. The method of claim 1, wherein the determined amount of the set of data comprises one of a percentage of memory occupied by the set of data and a number of data sets in the set of data.

3. The method of claim 1, wherein determining whether the set of data in memory exceeds one threshold comprises determining whether the set of data exceeds one of a multiple number of thresholds, wherein exceeding one threshold increases the number of paths to the storage device that are blocked.

4. The method of claim 3, further comprising determining the threshold value that the set of data in memory exceeds, wherein each incrementally higher threshold value corresponds to blocking one more path, wherein indicating the paths that are blocked comprises indicating a number of paths blocked that corresponds to the paths blocked for the determined threshold value.

5. The method of claim 4, further comprising:

determining whether the amount of the set of data exceeds an absolute limit after receiving the I/O request; and indicating to a sender of a write I/O request a beginning of a state during which no more write I/O requests will be processed after determining that the absolute limit is exceeded.

6. The method of claim 5, further comprising:

determining whether the amount of the set of data is less than a lower threshold after indicating that no more I/O requests will be processed, wherein the lower threshold is less than the absolute limit; and indicating, to the sender that received the message indicating the state during which no more write I/O requests will be processed, that the state has ended and that write I/O requests will be received.

7. The method of claim 1, further comprising:

determining, before denying the I/O request, whether the blocked path the I/O request attempts to use to access the storage device has denied I/O requests for a predetermined time; and processing the I/O request using the blocked path after determining that the blocked path has denied I/O requests beyond the predetermined time, wherein denying the I/O request occurs after determining that the blocked path has not denied I/O requests beyond the predetermined time.

8. The method of claim 7, wherein the predetermined time comprises one of a number of instances access has been denied to the blocked path and a time period during which the blocked path has not received I/O requests.

9. The method of claim 1, wherein the storage device is a first storage device, and wherein the set of data comprises data updates to the first storage device that are to be copied to a second storage device, wherein each blocked path is available to transfer data from the set of data to the second storage device.

10. A system for limiting input/output (I/O) requests from an application program, comprising:

a processing unit capable of receiving I/O requests from an application program;

a storage device accessible to the processing unit, wherein there are multiple storage paths providing access to the storage device;

a memory accessible to the processing unit including a set of data; and program logic executed by the processing unit, comprising:

(i) means for determining whether an amount of the set of data in memory exceeds at least one threshold;

(ii) means for indicating at least one of the multiple paths to the storage device as blocked to I/O requests from the application program, wherein each indicated blocked path is available for processing the set of data in memory;

(iii) means for receiving an I/O request from the application program;

(iv) means for determining whether the received I/O request intends to access the storage device using one indicated blocked path; and (v) means for denying the I/O request access to the storage device via the blocked path.

11. The system of claim 10, wherein the determined amount of the set of data comprises one of a percentage of memory occupied by the set of data and a number of data sets in the set of data.

12. The system of claim 10, wherein the program logic for determining whether the set of data in memory exceeds one threshold comprises means for determining whether the set of data exceeds one of a multiple number of thresholds, wherein exceeding one threshold increases the number of paths to the storage device that are blocked.

13. The system of claim 12, wherein the program logic further comprises means for determining the threshold value that the set of data in memory exceeds, wherein each incrementally higher threshold value corresponds to blocking one more path, and wherein the program logic for indicating the paths that are blocked comprises means for indicating a number of paths blocked that corresponds to the paths blocked for the determined threshold value.

14. The system of claim 13, wherein the program logic further comprises:
   means for determining whether the amount of the set of data exceeds an absolute limit after receiving the I/O request; and
   means for indicating to a sender of a write I/O request a beginning of a state during which no more write I/O requests will be processed after determining that the absolute limit is exceeded.

15. The system of claim 14, wherein the program logic further comprises:
   means for determining whether the amount of the set of data is less than a lower threshold after indicating that no more I/O requests will be processed, wherein the lower threshold is less than the absolute limit; and
   means for indicating, to the sender that received the message indicating the beginning of the state during which no more write I/O requests will be processed, that the state has ended and that write I/O requests will be received.

16. The system of claim 10, wherein the program logic further comprises:
   means for determining, before denying the I/O request, whether the blocked path the I/O request attempts to use to access the storage device has denied I/O requests for a predetermined time; and
   means for processing the I/O request using the blocked path after determining that the blocked path has denied I/O requests beyond the predetermined time, wherein denying the I/O request occurs after determining that the blocked path has not denied I/O requests beyond the predetermined time.

17. The system of claim 16, wherein the predetermined time comprises one of a number of instances access has been denied to the blocked path and a time period during which the blocked path has not received I/O requests.

18. The system of claim 10, wherein the storage device is a first storage device, further comprising a second storage device, wherein the set of data comprises data updates to the first storage device that are to be copied to the second storage device, wherein each blocked path is available to transfer data from the set of data to the second storage device.

19. An article of manufacture for use in programming a processing unit to limit input/output (I/O) requests from an application program to a storage device to facilitate the processing of data in memory, the article of manufacture comprising computer readable storage media including at least one computer program embedded therein that causes the processing unit to perform:
   determining whether an amount of a set of data in memory exceeds at least one threshold;
   indicating at least one of multiple paths to the storage device as blocked to I/O requests from the application program, wherein each indicated blocked path is available for processing the set of data in memory;
   receiving an I/O request from the application program;
   determining whether the received I/O request intends to access the storage device using one indicated blocked path; and
   denying the I/O request access to the storage device via the blocked path.

20. The article of manufacture of claim 19, wherein the determined amount of the set of data comprises one of a percentage of memory occupied by the set of data and a number of data sets in the set of data.

21. The article of manufacture of claim 19, wherein determining whether the set of data in memory exceeds one threshold comprises determining whether the set of data exceeds one of a multiple number of thresholds, wherein exceeding one threshold increases the number of paths to the storage device that are blocked.

22. The article of manufacture of claim 21, further causing the processing unit to perform determining the threshold value that the set of data in memory exceeds, wherein each incrementally higher threshold value corresponds to blocking one more path, wherein indicating the paths that are blocked comprises indicating a number of paths blocked that corresponds to the paths blocked for the determined threshold value.

23. The article of manufacture of claim 22, further causing the processing unit to perform:
   determining whether the amount of the set of data exceeds an absolute limit after receiving the I/O request; and
   indicating to a sender of the I/O request a beginning of a state during which no more I/O requests will be processed after determining that the absolute limit is exceeded.

24. The article of manufacture of claim 23, further causing the processing unit to perform:
   determining whether the amount of the set of data is less than a lower threshold after indicating that no more I/O requests will be processed, wherein the lower threshold is less than the absolute limit; and
   indicating, to the sender that received the message indicating the beginning of the state during which no more I/O requests will be processed, that the state has ended and that I/O requests will be received.

25. The article of manufacture of claim 19, further causing the processing unit to perform:
   determining, before denying the I/O request, whether the blocked path the I/O request attempts to use to access the storage device has denied I/O requests for a predetermined time; and
   processing the I/O request using the blocked path after determining that the blocked path has denied I/O requests beyond the predetermined time, wherein denying the I/O request occurs after determining that the blocked path has not denied I/O requests beyond the predetermined time.

26. The article of manufacture of claim 25, wherein the predetermined time comprises one of a number of instances access has been denied to the blocked path and a time period during which the blocked path has not received I/O requests.

27. The article of manufacture of claim 19, wherein the storage device is a first storage device, and wherein the set of data comprises data updates to the first storage device that are to be copied to a second storage device, wherein each blocked path is available to transfer data from the set of data to the second storage device.

* * * * *

UNITED STATES PATENT AND TRADEMARK OFFICE
CERTIFICATE OF CORRECTION

PATENT NO. : 6,408,348 B1
DATED : June 18, 2002
INVENTOR(S) : Lawrence Carter Blount et al.

It is certified that error appears in the above-identified patent and that said Letters Patent is hereby corrected as shown below:

Column 10,
Line 46, "program logic executed...comprising:" should be a new paragraph.

Signed and Sealed this

Seventh Day of September, 2004

JON W. DUDAS
*Director of the United States Patent and Trademark Office*